(12) United States Patent  
Danelski

(10) Patent No.: US 8,073,562 B2
(45) Date of Patent: Dec. 6, 2011

(54) PICKING SYSTEM WITH PICK VERIFICATION

(75) Inventor: Darin L. Danelski, Oconomowoc, WI (US)

(73) Assignee: Innovative Picking Technologies, Inc., Ixonia, WI (US)

( * ) Notice: Subject to any disclaimer, the term of this patent is extended or adjusted under 35 U.S.C. 154(b) by 1063 days.

(21) Appl. No.: 11/627,829

(22) Filed: Jan. 26, 2007

(65) Prior Publication Data

US 2008/0183327 A1 Jul. 31, 2008

(51) Int. Cl.
*G06F 7/00* (2006.01)

(52) U.S. Cl. .......................................... 700/216; 70/215

(58) Field of Classification Search .................. 700/216, 700/214, 215, 213
See application file for complete search history.

(56) References Cited

U.S. PATENT DOCUMENTS

| | | | |
|---|---|---|---|
| 4,792,273 A * | 12/1988 | Specht | 414/807 |
| 5,781,443 A | 7/1998 | Street et al. | |
| 5,812,986 A | 9/1998 | Danelski | |
| 6,597,969 B2 * | 7/2003 | Greenwald et al. | 700/216 |
| 6,650,225 B2 | 11/2003 | Bastian, II et al. | |
| 6,762,681 B1 | 7/2004 | Danelski | |
| 6,775,588 B1 | 8/2004 | Peck | |
| 6,873,881 B1 | 3/2005 | Schneible, Sr. | |
| 7,084,738 B2 | 8/2006 | Bastian, II | |
| 2005/0043850 A1 * | 2/2005 | Stevens et al. | 700/213 |
| 2005/0140498 A1 * | 6/2005 | Bastian, II | 340/5.92 |
| 2005/0149226 A1 * | 7/2005 | Stevens et al. | 700/214 |
| 2006/0238307 A1 * | 10/2006 | Bauer et al. | 340/10.1 |

* cited by examiner

*Primary Examiner* — Ramya Prakasam
(74) *Attorney, Agent, or Firm* — Reinhart Boerner Van Deuren P.C.

(57) ABSTRACT

An inventory system with feedback for picking or placing items is disclosed. In this system, there is a plurality of bins or storage locations, one for each item stored. The bins are typically used in a warehouse to fulfill and ship orders of a list of items. Each bin or pair of bins is equipped with a module for directing a picking specialist to the correct bin for manually picking an order. When the picking specialist reaches into a bin to select an item, a passive heat sensor senses heat from the picker's hand, or a magnet detecting circuit detects a magnet on the picker's hand or wrist. This provides positive feedback that the correct bin was sought to retrieve the item, or an alarm or other signal may indicate the incorrect bin. The system may also be used to replenish inventory or return items to stock.

12 Claims, 2 Drawing Sheets

PICKING SYSTEM WITH PICK VERIFICATION

FIELD OF THE INVENTION

This invention generally relates to manual picking systems in warehouses or other distribution centers.

BACKGROUND OF THE INVENTION

The development of Internet sales and the shipping of packages and goods in response to Internet orders has elevated the importance of operations in warehouses of those who provide the goods. Typically, goods are stored in warehouses and orders are received from buyers, whether through the Internet or other, more conventional means, such as from mail-order or telephone order intake. The goods are then selected in accordance with the customer's order, and are shipped via delivery or mail service.

It is important to operate distribution centers, their associated warehouses, and the processes for picking or sorting of the ordered goods in an efficient manner. This insures that a high volume of orders can be processed through the warehouse and that operation costs can be kept to a minimum. Product picking for consumer orders is different from order processing for an industrial customer. The number of items picked for consumer orders tends to be rather small, possibly as low as one or two items per order, compared to tens or hundreds of items picked for industrial customers. The number of orders processed per hour to maintain the same return on investment is far greater for consumer sales than for industrial sales. Thus, it is important to have systems and procedures in place to process each order very quickly.

These systems should take into account the need for returning items to stock. Returns take two forms, depending on whether the item is un-opened. Un-opened items are generally returned to stock and are handled as a reverse pick (or put), in which the picking specialist simply returns the item to the proper storage location. Opened items, for return to the manufacturer, are generally handled in a separate area, with locations associated with each manufacturer, rather than for each particular product.

U.S. Pat. No. 5,781,443 discloses an inventory and picking system for a plurality of bins or storage locations on shelves. The shelves each have an electronic module for displaying information about three separate items on the shelves. The modules also have three infrared light emitting diodes and three infrared detecting circuits for detecting light that is reflected, such as light reflected from a hand that reaches into the bin or storage area. This system is subject to error from dust or other anomalies in the atmosphere or generally in a dusty warehouse, which may give off falsely positive feedback to the controller.

One way to manage orders in a manual system is disclosed in U.S. Pat. No. 5,812,986 to Danelski. This patent discloses a picking system in which an order is received and sent to a picking system computer. The system includes an RF module on each storage site or bin in the storage system. The computer then sends radio-frequency (RF) signals to the RF modules corresponding to items on the order. Each RF module signaled corresponds to an item on the order. The signal causes a light on the RF module to be lit and the signal also includes a quantity desired for the order. A picking specialist then surveys the inventory sites, goes to those sites for which a light is lit, picks the desired quantity for the order, and signals that the particular item has been picked. While this method works, it is expensive to provide the modules for each location, and it is also expensive to maintain and power the modules. In addition, the picker must physically push a button or switch to indicate that the item has been picked.

Another system, disclosed in U.S. Pat. No. 6,650,225, offers an improvement over Danelski. The improved system includes a proximity detector near at least one of the modules or sites. The detector can report that there was activity or motion sensed in the vicinity of the module, thus inferring that the picking specialist was at least near the module. This may lead to false positives, i.e., an indication that the correct bin was picked when it was merely a nearby bin. If a "pitch and catch" LED system is used, a false negative may be generated, i.e., the correct bin was used, but insufficient light was reflected back to the sensor to generate a positive response. An improvement to the '225 patent is disclosed in U.S. Pat. No. 7,084,738. In the improvement, the module for each site is upgraded to include an image display. The display allows the picking specialist to more positively determine that the item in the bin or site corresponding to the module is the item desired. This will obviously be an expensive improvement.

Another system is disclosed in U.S. Pat. No. 6,775,588. The system disclosed in this patent uses a portable computer on a cart, the cart also having at least two bins for storing goods that are picked. As the operator moves the cart through the warehouse or inventory area, the wireless-equipped computer causes lights on display modules to illuminate. The display module, one per inventory item, illuminates its light in response to a signal from the computer, and also displays an indicia of the order number and quantity, so that the correct number of items can be placed into the correct bin on the cart. The computer can also indicate the desired location of goods to the operator. This system will be expensive, because of the need for modules at each warehouse location, and also because of the required computer and cart to carry out the order-picking process.

Each of the above systems has its strong points. The weak point for each system, in addition to any technical nuances, is its cost. Embodiments of the invention disclosed in this patent provide a picking system that is both cost-effective and efficient. These and other advantages of embodiments of the invention, as well as additional inventive features, will be apparent from the description provided herein.

BRIEF SUMMARY OF THE INVENTION

One embodiment is an inventory system with positive pick feedback. The system includes a plurality of inventory storage locations, a module with an indicating light, and optionally a display, near each storage location or each pair of storage locations, the module also including a passive heat detector for detecting heat from a hand entering the storage location, or one of the pair of storage locations, and a computer system in communication with the modules, the computer system configured to receive a list of items on an order and to activate the indicating light and to post a quantity on the optional display on the module corresponding to a storage location with an item on the list of items of the order.

Another embodiment is an inventory system with positive pick and place feedback. The inventory system includes a plurality of storage locations, each of said plurality of storage locations located at an assigned location, a module with an indicating light, and optionally a display, in close proximity to each pair of storage locations, the module also including a passive heat detector for detecting heat from a hand entering one of the pair of storage locations, and optionally including a transceiver configured for sending or receiving a signal, a computer system in communication with the modules, the computer system configured to receive a list of items on an order and to activate the indicating light and to post a quantity on the optional display on the module corresponding to a storage location with an item on the list of items of the order, and optionally, an identification member configured for sending a uniquely identifying response to the transceiver.

Another embodiment is a method for manually picking or placing items in a computerized inventory system. The method includes steps of: providing an array of storage locations holding items, each storage location or pair of storage locations in the array located near a module with an indicating light and a passive heat detector, the module optionally including a transceiver for communicating with at least one identification member; providing a list of the items and an indication of a quantity desired for each item on the list providing a container for picking or placing the items on the list; sending information to a computer system in communication with each of the modules concerning the list of items and the quantity of each item on the list of items; operating the computerized system in communication with the modules to light the indicating light on the module corresponding to a storage location holding an item on the list; and, picking a quantity of items from the storage location and placing the items into the container, or placing a quantity of items from the container into the storage location, wherein heat from the step of picking or placing activates the passive heat sensor and communicates positive feedback to the computer system, or optionally, the transceiver receives a signal uniquely identifying the at least one identification member.

Another embodiment is an inventory system with positive pick feedback. The system includes a plurality of inventory storage locations, a module with an indicating light, and optionally a display, near each storage location or each pair of storage locations, the module also including an electric circuit for detecting a magnet on a wrist or a hand entering the storage location, or one of the pair of storage locations, and a computer system in communication with the modules, the computer system configured to receive a list of items on an order and to activate the indicating light and to post a quantity on the optional display on the module corresponding to a storage location with an item on the list of items of the order.

Another embodiment is an inventory system with positive pick and place feedback. The system includes a plurality of storage locations, each of said plurality of storage locations located at an assigned location, a module including an indicating light, and optionally a display, in close proximity to each pair of storage locations, the module also including an electric circuit for detecting a magnet entering one of the pair of storage locations and optionally including a transceiver configured for sending or receiving a signal, and a computer system in communication with the modules, the computer system configured to receive a list of items on an order and to activate the indicating light and to post a quantity on the optional display on the module corresponding to a storage location with an item on the list of items of the order. Optionally, the system may include an identification member configured for receiving a signal from the transceiver and sending a uniquely identifying signal to the transceiver.

Another embodiment is a method for manually picking or placing items in a computerized inventory system. The method includes providing an array of storage locations holding items, each storage location or pair of storage locations in the array located near a module with an indicating light and a magnet detecting circuit, the module optionally including a transceiver for communicating with at least one identification member. The method also includes providing a list of the items and an indication of a quantity desired for each item on the list, providing a container for picking or placing the items on the list, sending information to a computer system in communication with each of the modules concerning the list of items and the quantity of each item on the list of items, and operating the computerized system in communication with the modules to light the indicating light on the module corresponding to a storage location holding an item on the list. The method also includes picking a quantity of items from the storage location and placing the items into the container, or placing a quantity of items from the container into the storage location, whereby a magnet worn by a picker is detected by the circuit and communicates positive feedback to the computer system, or optionally, the transceiver receives a signal uniquely identifying the at least one identification member.

Other aspects, objectives and advantages of embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS

Embodiments of the pick system with verification are preferably implemented with computer control over several aspects of the order. For instance, orders from customers preferably are entered by the customer, for example, from a template or order form available on the Internet. Alternatively, orders may be taken over the telephone, or sent in electronically or via facsimile, and then transcribed or entered into a computer by an operator or inside sales personnel. In any event, a list of items desired is preferably generated and sent to a computer system that operates the pick system with verification or is in communication with the computer that operates the pick system with verification.

Figure 1:
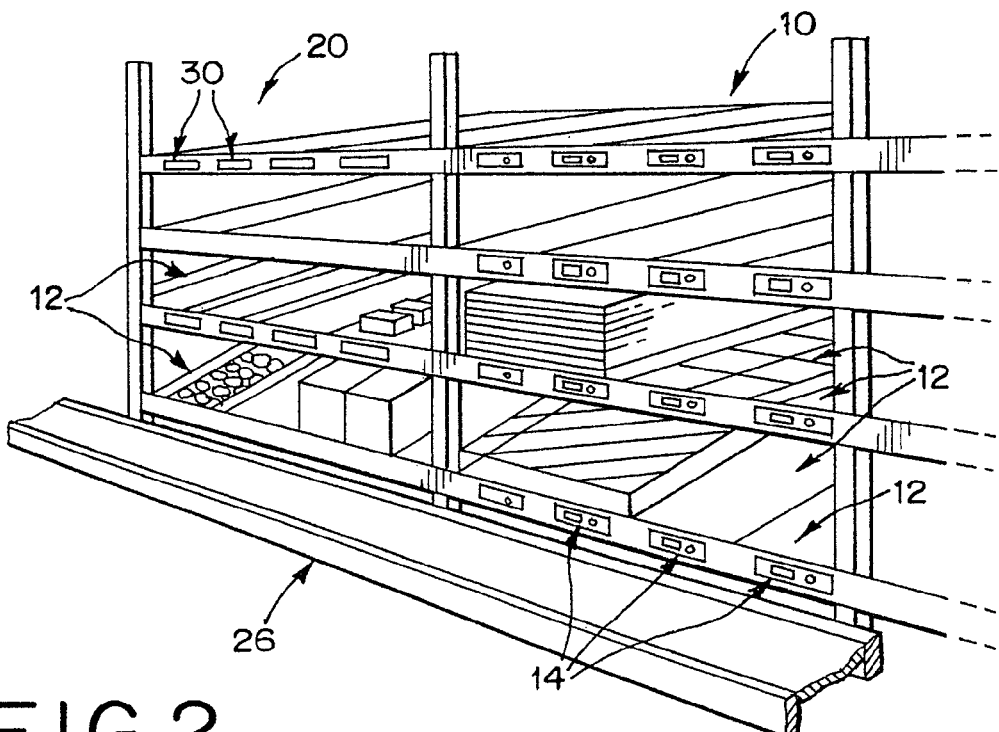
FIG. 1 is a perspective view of an inventory system including pick verification module embodiments as described herein.
Figure 2:
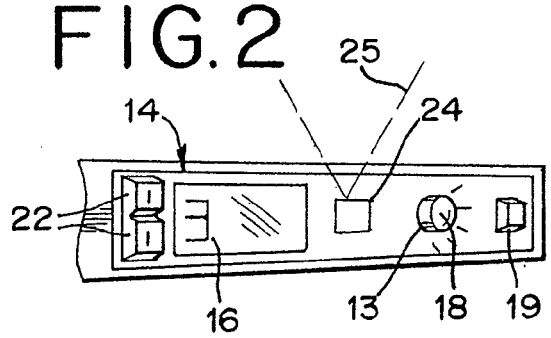
FIG. 2 is a first embodiment of a pick verification module.
Figure 3:
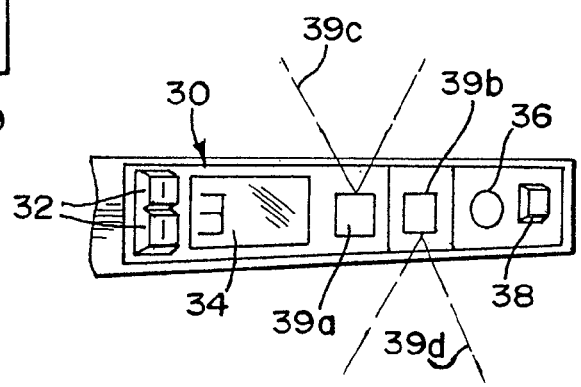
FIG. 3 is a second embodiment of a pick verification module.

An inventory control system with pick modules with verification is shown in FIGS. 1-3. In order to show two embodiments of pick modules with verification, the inventory control system is divided into two sections. A first inventory section 10 includes a plurality of storage locations 12 on tiers or shelves. Each storage location has a pick module with verification 14 adjacent the storage location or nearby. The pick module with verification 14 is suitable for a single storage location and will be described below. The second inventory section 20 also includes a plurality of storage locations 12, but uses a second embodiment of pick modules with verification 30. In the second section, each pick module with verification 30 is suitable for two storage locations. As shown, each second embodiment of a pick module with verification 30 manages inventory for a first storage location above the module and a second storage location below the module. The inventory control system may also include a roller conveyor 26 located in front of the inventory section racks to support containers for picking the order, such as plastic totes or corrugated shipping boxes, which are moved through the storage area for receiving items selected from the storage locations in order to fill individual orders.

The first embodiment of the pick system with verification is a module 14 that, as shown, preferably is positioned adjacent and below the inventory storage location. The module 14 may include a display 16, preferably with a one to four digit capability. Some modules may have only two or three digits, and some modules may have no display. An indicator light 18 with a covering lens 13 may be illuminated by the inventory control system to indicate that items from the corresponding storage location are desired for the order that is pending. In some systems, indicator light 18 may be capable of emitting light of more than one color, so that more than one order for manual picking may be fulfilled at a time. Module 14 may also include a task-complete switch or button 19, by which the picking specialist indicates to the control system that this item has been picked.

There are also preferably inventory adjust buttons 22, for indicating that stock has been added (up) or removed (down). A button may be pushed once for each unit of inventory added or removed. In addition, module 14 includes a passive infrared heat detector 24 with a preferred area 25 for detecting heat, including the movement of heat. The heat detector 24 does not rely on reflected light or other "pitch and catch" systems which are subject to interference. Passive infrared heat detectors are available from many commercial sources, such as Dexter Research, Dexter, Mich., U.S.A. Models S-80 and T-80 may be configured for aiming at wide or narrow areas. Others are available from Nippon Ceramic, Los Angeles, Calif., U.S.A., and Tokyo, Japan, part numbers SSAC-10 and SDA02-54, and also from muRata, Smyrna, Ga., U.S.A., the IRA-E700 series.

When the inventory specialist moves a container, such as a shipping box or a plastic tote along roller conveyor 24 to fill an order, the specialist stops at the storage location 12 for which the indicator light 18 of module 14 is illuminated. If the indicator light is capable of emitting light of more than one color, the specialist stops only at the illuminated lights of a particular color designated for the order presently being picked. The display 16 of the module is preferably used to indicate the quantity of items desired for the order. When the specialist reaches over the module and into the bin to retrieve the part or parts, heat detecting sensor 24 senses the increase in temperature of the person's hand, the movement of a warm hand, or both. This is a positive indication that the correct storage location has been found and that inventory is being removed from the correct storage location. The sensor may be aimed upwardly as shown for a storage location above the module, or may be aimed downwardly, for use with a storage location below the module.

The specialist then removes the indicated number of items from the storage location and places them in the appropriate box or tote. The specialist may optionally then press the "task-complete" button 19 and may decrement the inventory count by depressing the down button 22 one or more times. If inventory is being placed into the storage location, the specialist may instead increment the inventory count by pressing the up button one or more times. The relatively inexpensive heat-detecting infrared sensor 24, depicted with an upward-directed sensing field 25, insures that the correct item has been picked. In other embodiments, the heat-detecting infrared sensor may have a sensing field aimed downwardly, to detect a hand entering a bin below the module. In other embodiments, the module may be made more economical by eliminating the task complete button 19. This also simplifies the order-picking task, since the specialist need not stop to press the task complete button and wait for confirmation.

Alternatively, each pick module with verification 30, as shown in FIG. 3, may be suitable for managing two storage locations, one above and one below the unit, as depicted in second inventory section 20. In this embodiment, module 30 includes up and down buttons 32 for incrementing and decrementing the inventory, a display 34 for indicating a desired quantity or other information, an illumination light 36, and an order-complete button 38, similar to the features on module 20. In addition, module 30 includes first passive heat sensitive detector 39a, with its sensing field 39c aimed upwardly at a first storage location, and second passive heat sensitive detector 39b, with its sensing field 39d aimed downwardly at a second storage location. In other embodiments, the passive heat-sensitive detectors may be aimed left and right, rather than upwards and downwards. In some embodiments, the module may have no display, but instead have two indicating lights, one for a storage location above and a second light corresponding to a storage location below.

It is desirable for inventory control systems to be able to fill more than one order at the same time, i.e., to have more than one picking specialist on the floor at any one time. However, the picking specialist will need to distinguish the modules that correspond to storage locations and items on his or her particular list. This may be accomplished with the display or lights on the module, for instance, by indicating not only the quantity in the particular location, but also the order number or picker identification. For instance, a picker may distinguish the modules and storage locations for a given order based on a color of the illumination light 18, 36 of the module. The illumination light may be capable of displaying more than one color, one at a time, so that the picker will approach only the modules displaying a certain color.

In one embodiment, an inventory pick verification module 40 will include a microprocessor controller 41, additional memory 42, and three diodes or lamps 44, each connected to the controller via outputs of the microprocessor controller. In this embodiment, the three lamps may be red, green, and blue, and additional colors may be achieved by illuminating two lamps at a time, e.g., illuminating green and red to yield an orange color, or illuminating red and blue to yield a violet color. If all three LEDs are lit, red, blue and green, white light results. Alternatively, there may be a separate LED or incandescent lamp to illuminate each color. There may also be a display 46, such as a display of four digits or more, for the picker to read off a quantity or other information.

Figure 5:
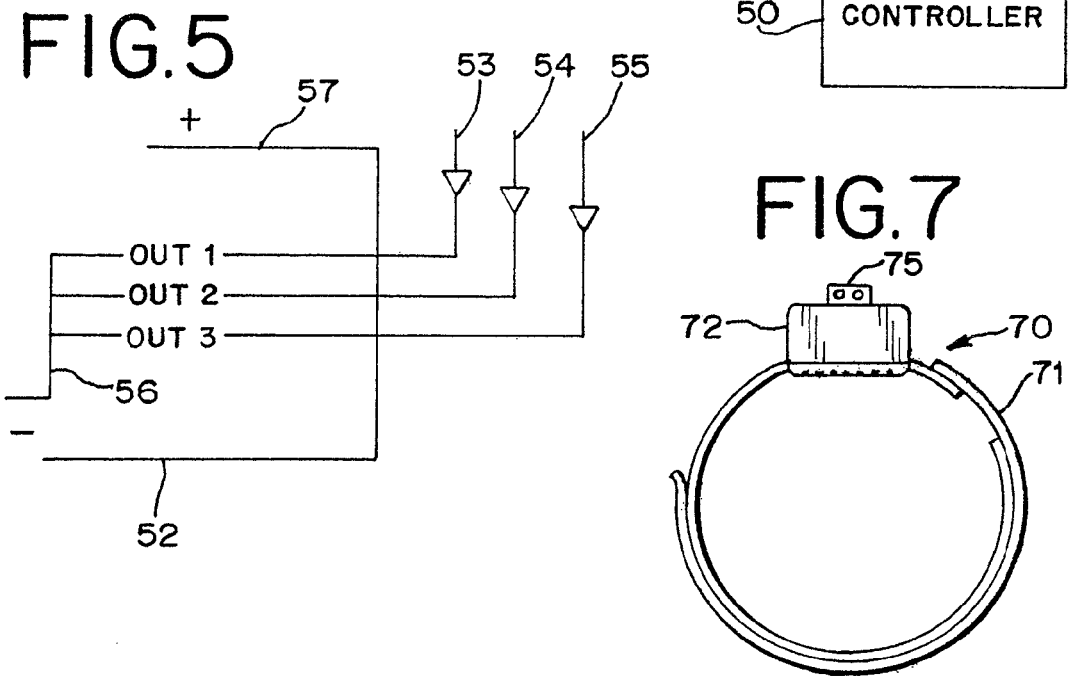
FIG. 5 is a schematic view of an LED control system for a pick verification module.

An additional view of a controller 52 for controlling a plurality of LEDs 44 is shown in FIG. 5. LEDs 53, 54, 55 may each be a different color, such as red, green, and blue, and are each connected to outputs 56 of the controller and also to a voltage input 57, such as a +5 volt line. Other LEDs or other lamps may use different voltages. In this embodiment, the controller 52 can allow one lamp, such as an LED, to be lit at a time, or may allow more than one lamp to be lit, e.g., green and blue may be illuminated at the same time to yield an aqua color.

In embodiments using more than one LED to "mix" colors into a combination color as described above, the covering lens is preferably made from an acrylic material that is specifically designed for the transmission and color mixing of LED light. This material is made by Cyro Industries, Inc., Rockaway, N.J., U.S.A., and is available as Acrylite® Satin Ice Acrylic. Other acrylics may be used, and other materials may be used for the lens cover.

As noted, the pick verification module will have at least one passive heat detecting sensor 49, for detecting heat from a user entering the module to pick or place a quantity of the items into the particular bin or storage location. Module 40 will also have several other inputs and outputs 45, which may be hard wired or which may be wireless, such as radio-frequency inputs/outputs. The inputs include at least a source of power, such as inputs from a battery or other source of power. The inputs also include a connection to an inventory system controller 50 and its inputs/outputs 51, which connection may be hard wired or which may be wireless. If the module is meant for use with two inventory bins or storage locations, it may be useful to provide two additional lights or indicia 43 on the module, such as lights with an arrow pointing "up" or "down," to indicate to the picker which of the bins or storage locations contains the desired item on the list.

The above system may be considered a "pick-to-light" system, since the person who is picking moves from one storage area to the next as indicated by the moving light. Of course, inventory must occasionally be replenished or items returned to stock. In some embodiments, it may be just as efficient to use a tote or other container, and possibly a list, to place items into the desired bins or storage areas. The process described above is repeated, but with items placed into the bins, in what may be known as a "put-to-light" system.

It may also be helpful, but not necessary, to provide feedback to the computer system that the correct quantity of an item has been picked. This feedback desirably takes place during the picking process, so that when the heat detector signals to the system that an item on the list has been picked, the signal may include an indication of the quantity that has been picked. When an item has been picked, the specialist may signal an indication of the quantity if the prescribed quantity has not been picked.

For example, after picking an item and after the heat detector notes that the correct bin or inventory location was used, the specialist may depress a number key and a function or other key for which the computer has been programmed to understand, "so many items picked." A transmission of "4, enter," may indicate that only 4 items were picked. In other embodiments, each rack or area may include a switch, a module, or a computer in communication with the computer system. The inventory specialist indicates successful or unsuccessful completion of an item by depressing the switch or otherwise communicating using the module or the local computer the actual number picked. This sequence continues until each item on the list has been picked. If a bin or storage location is empty, the picker may note the location by placing his or her hand in the bin or location to trigger the sensor, and then entering a "zero" quantity to indicate that the bin is empty, whether the inventory count so indicates or not.

If the quantity of items picked has not been communicated to the computer system during the picking process, the specialist should return the list (if one is used) and the tote, and then enter the quantities picked into the inventory system computer. This will update the quantity counts and may also cause the system to re-order items for which the quantity has reached a count that indicates a stock minimum or less. The customer list should also be updated, electronically or manually, so that when the order is shipped to the customer there is an indication that one or more items from the list are admittedly not complete, and that the order will be filled later.

Figure 7:
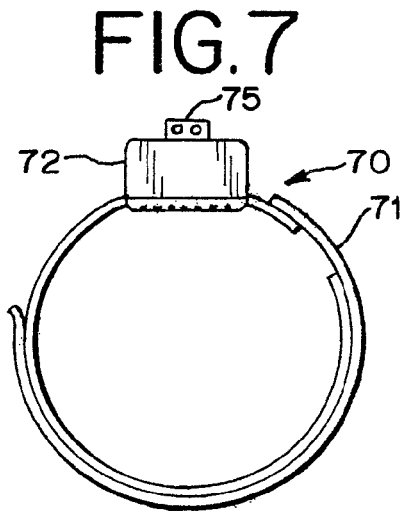
FIGS. 6-7 depict an alternate module and wrist identification member.

There are of course other ways to achieve positive pick or put feedback, such as those revealed in U.S. Pat. No. 6,762,681, which is also owned by the assignee of this patent. One alternate, for which equipment may be included in embodiments of the module described above, is depicted in FIGS. 6-7. In this embodiment, module 60 is similar to the modules described above, but also includes a transceiver 61 for communicating with a personal or individual identification member 70, which is preferably worn around a wrist of a picking specialist. Module 60 may be used with a single storage location, as shown, or may also be equipped with an additional passive infrared sensor for use with two storage locations or bins.

Module 60 includes transceiver 61, up-down buttons 62, a display 63, and a passive infrared sensor 64 with single upward looking zone 64a. Upwardly-aimed passive infrared sensor 64 detects heat from a hand that enters a bin or storage location above sensor 64. Module 60 also includes at least one LED 67 and a lens cover 68, as described above, and an indicating button 69, preferably configured for use as a "task complete" button. During hot weather, it may be difficult for passive infrared sensors to distinguish body heat emanating from a hand H as opposed to heat from other nearby objects coincidentally at 98-99° F. To enhance system reliability under all conditions, module 60 may include transceiver 61 for sending and receiving signals, such as infrared-frequency signals.

Transceiver 61 may send an infrared inquiry to individual identification member 70, which may be worn on the wrist of a picking specialist. Individual identification member 70 may include a wrist band 71 and housing 72, with transceiver 73 inside. As is well known to those skilled in the art, member 70 may include numerous other parts, such as a battery and a control circuit. Alternatively, transceiver 73 may periodically emit identifying data that is received by transceiver 61.

Figure 6:
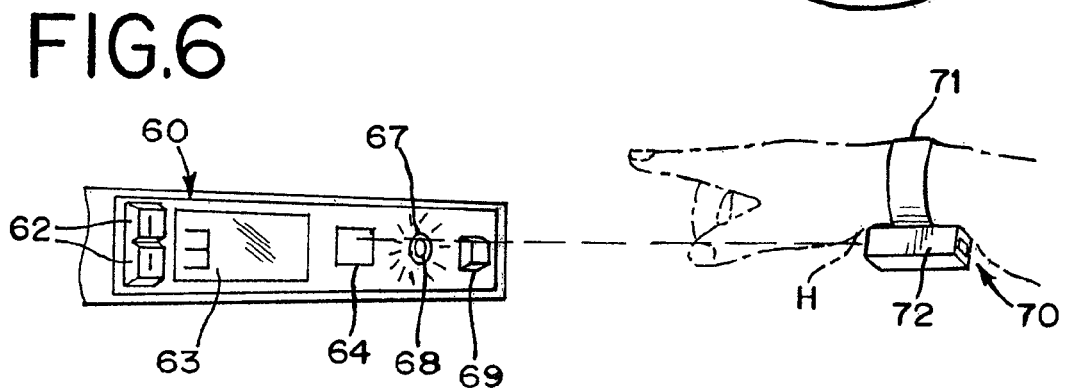

After receiving an order to pick or to put into the bins, module 60 also sends out or emits a signal (not shown) from the transceiver 61. The signal attempts to query any identification member 70 located near the module 61. The range of the signal is very short, such that the identification member 70 must be approximately in the position shown in FIG. 6 for the signal to be received by the member 70. When the user's hand H is positioned as shown in FIG. 6 to actuate switch 69, the identification member 70 receives the signal from the transceiver 61 and generates a response signal. The response infrared signal emitted from the transceiver 73 on the identification member 70 is received by infrared transceiver 61. Transceiver 61 is in communication with the module central controller (not shown), and the signal received by the transceiver 61 is transmitted through the module controller to the central controller 50.

The infrared signal from the identification member 70 has a unique identifier assigned to the particular inventory specialist, preferably using the IrDA (Infrared Data Association) standard protocol. Using data stored for each of the identification members 70 in a signal database, such as memory module connected to the central controller 50, central controller 50 is able to recognize the identity of the user making the particular pick or put of items from the particular storage location. In addition, an identification member 70 may be worn by each person assigned to an order fulfillment area, the central controller 50 has a record of the identity of each member 70, and thus the person, that removed from or placed items into each storage location 12 for filling orders. This allows the productivity of each user to be measured, and also identifies the person that may have made mistakes in filling an order such as by putting or placing an incorrect number of items, by placing the items into the wrong order receptacle, or by putting items into the incorrect storage location. Alternatively, another radio frequency band or identification method may be used, such as analog radio frequency (RF), or a digital RFID technique, but infrared is preferred.

Figure 8:
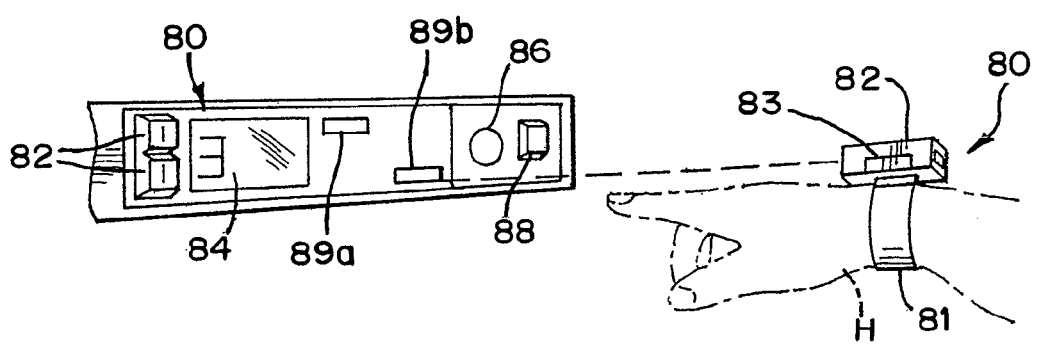
FIG. 8 depicts another alternate module and a magnet for a hand or a wrist.
Figure 4:
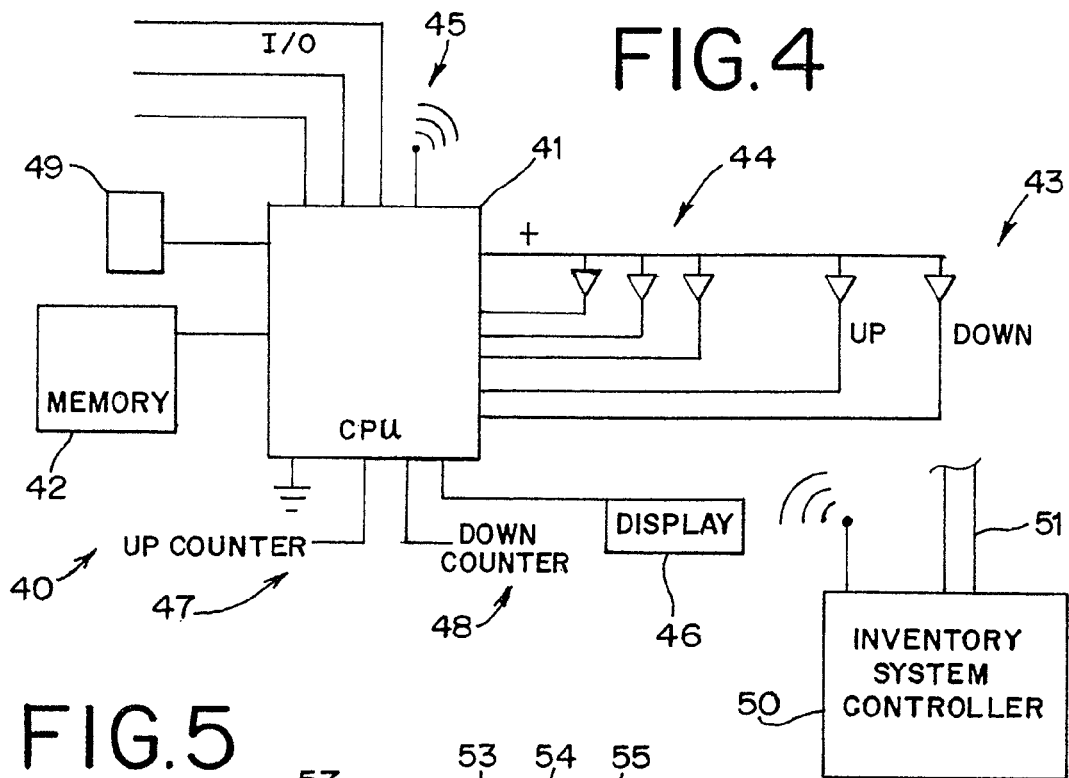
FIG. 4 is a schematic view of an inventory control system with a pick verification module.

In another embodiment, the picking specialist may use magnetic detection to verify the picking specialist and the bin or storage location entered. In one example shown in FIG. 8, the picking specialist using equipment 80. The magnetic equipment preferably includes wears a wrist band 81 and a magnet 82 within housing 83. When the picking specialist needs to enter a bin or storage location, module 80 includes an upper magnet detection circuit 84*a* and a lower magnet detection circuit 86*a*. The two magnet detection circuits are placed and tuned, respectively, to detect a magnet entering a storage location above and below module 80. In another embodiment, magnet 82 and housing 83 may be attached to a ring (not shown) worn on a finger of a user. Alternatively, the module may be equipped with only a single magnet detection circuit for a bin or storage location either above or below the module.

There are a variety of magnet detection circuits. One type is a magneto-resistive circuit, such as Honeywell HMC 1501 and 1512 magneto-resistive sensors, sold by Honeywell, Inc., Minneapolis, Minn., U.S.A. These sensors detect a field from a magnet that is moving near the sensor. They may be tuned to a given threshold for detecting a magnet. Another type is a Hall-effect sensor, which will detect the presence of a magnetic field from a magnet. Examples are the A3211 and A3212 Hall-effect switches from Allegro Microsystems, Worcester, Mass., U.S.A. These switches may be used in circuits with the magnet in the wrist band or ring of the picking specialist. Other circuits to detect a magnet entering the bin or storage location may also be used.

In addition, module 80 includes other features useful in an inventory system, including inventory adjust buttons 82, lights 84, 86, and a confirmation button 88. This embodiment does not include a display. In this embodiment, the default quantity for picking is a single unit and this default serves as an indication of the quantity of items desired in systems without a display on one or more modules. The picker is instructed that if there is no module and light 84 or 86 is light, a single unit from the appropriate bin or storage location, as noted by arrow 84*b* or 86*b*, is to be picked. A display, as described above, preferably with a 1-4 digit capability, may also be used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For instance, instead of wearing an identifying member or bracelet with a magnet or transceiver on the finger or wrist of a picking specialist, the magnet or transceiver may be pinned to a vest, shirt or hat of a picking specialist, the magnet or transceiver configured to avoid confusion as to the bin or storage location from which items were removed or into which items were placed. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated by context.

What is claimed is:

1. An inventory system with positive feedback for at least a first and a second inventory storage location of a plurality of inventory storage locations for storage of items therein in a manner accessible by a human picker's hand in filling an order for one or more item stored in the storage locations, the system comprising:

one or more modules disposed adjacent the first and second inventory storage locations and having separate and distinct first and second indicating lights and passive heat detectors, the indicating lights being selectively operable to indicate which of the first and second inventory storage locations the picker's hand should be inserted into and the first and second passive heat detectors being operatively disposed for detecting heat from the picker's hand and indicating which one of the first and second inventory storage locations the picker's hand had entered; and a computer system operatively connected in communication with the indicating lights and heat detectors of the one or more module, the computer system being configured to receive a list of items required for filling the order with an item stored in the one of the first and second storage locations and to activate the indicating light corresponding to either the first and second storage location in which the item is located, and to receive a signal from the detector associated with that storage location when the picker's hand enters that storage location and provide a positive feedback that the picker's hand entered the proper storage location based on the signal received from the heat detector associated with that storage location.

2. The inventory system of claim 1, wherein a single module is configured for placement between the first and second storage locations, and further comprises the first and second indicating lights and passive heat sensors.

3. The inventory system of claim 2, wherein the first storage location is disposed above the second storage location and the single module is configured for placement between the two storage locations, with the first and second passive heat detectors being operatively disposed such that heat from the picker's hand will be detected upon entering the storage first location above by the first passive heat detector, and wherein the heat from the picker's hand will be detected upon entering the second storage location below by the second passive heat detector.

4. The inventory system of claim 1, wherein the indicating light is a plurality of lights or a plurality of lights configured to be lit simultaneously.

5. The inventory system of claim 1, wherein the indicating light is a plurality of lights configured to be selectively lit simultaneously for mixing colors of the lights that are lit.

6. The inventory system of claim 1, further comprising an individual identification member with a transceiver and wherein the module further comprises a transceiver, wherein the module is configured for sending a signal to the identification member and the identification member is configured for sending a uniquely identifying response.

7. The inventory system of claim 1, wherein, the at least one module further comprises a display operatively connected to the computer system and the first and second indicating lights for displaying a quantity of the item stored in the one of the first and second storage locations required for filling the order and a task complete member by which the picker may enter an input indicative of the number of the items removed from the storage location.

8. The inventory system of claim 1, wherein:
each of said plurality of storage locations is located at an assigned location including at least one assigned location corresponding to a storage location with an item on the list of items of the order;
at least one module corresponding to the storage location holding the item on the list of items of the order includes a display and a transceiver configured for sending or receiving a signal; and
the computer system is further configured to post a quantity on the display of the at least one module corresponding to a storage location with an item on the list of items of the order; and
the system further comprises an identification member configured for sending a uniquely identifying signal to the transceiver.

9. The inventory system of claim 8, wherein the passive heat detector comprises two passive heat detectors, one for a storage location above and one for a storage location below the module, whereby heat from the hand of the user will be detected upon entering the storage location above by one of the passive heat detectors, and wherein the heat from the hand of the user will be detected upon entering the storage location below by the other of the passive heat detectors.

10. The inventory system of claim 8, wherein the module indicating light is configured for displaying more than one color of light.

11. The inventory system of claim 8, further comprising a container for the order.

12. The inventory system of claim 8, wherein the storage location is a bin.

* * * * *